Patented Jan. 26, 1954

2,667,461

UNITED STATES PATENT OFFICE 2,667,461

METHOD OF MAKING PLATINUM-CONTAINING CATALYSTS

Walter R. F. Guyer, Roselle, John P. Thorn, Elizabeth, and Erving Arundale, Westfield, N. J., assignors to Standard Oil Development Company, a corporation of Delaware No Drawing. Application December 21, 1950, Serial No. 202,130

6 Claims. (Cl. 252—442)

This invention relates to the preparation of catalysts and more particularly relates to the preparation of platinum-containing catalysts.

Catalysts containing platinum have been described for various processes in the prior art but the commercial use of such catalysts has been limited because of the cost of platinum. Some time ago a hydroforming process utilizing platinum-containing catalysts was disclosed in U. S. Patents 2,479,109 and 2,479,110. These patents disclose a preferred method for the preparation of platinum-containing catalysts. We have developed a new method of making platinum-containing catalysts which give vastly superior results in the hydroforming of naphthas. The patents referred to also disclose that hydrocracking is desired along with aromatizing reactions. We prefer to minimize the hydrocracking reaction which thereby results in a more selective process for producing aromatics. At lower pressures our process using the catalyst made according to our method reduces the amount of hydrocracking and increases the concentration of higher boiling aromatics in the naphtha or gasoline fraction being treated.

We have invented a new method of making platinum-containing catalysts which, when used for hydroforming naphthas or gasoline fractions, produce high yields of high octane number gasoline. Our catalyst is especially adapted for reforming light or heavy naphthas, straight run gasoline, cracked naphthas or mixtures thereof with the preceding feeds, selected naphtha fractions or mixtures thereof, in the presence of hydrogen. Also high yields of benzene, toluene, xylenes and other aromatics may be produced through the use of our new catalysts from cyclohexane concentrates, selected $C_6$, $C_7$ or $C_8$ aliphatic hydrocarbons or fractions rich in methyl cyclopentane or other $C_6$, $C_7$ or $C_8$ cycloparaffins. Virgin naphthas contain naphthenes, paraffins and some aromatics. The hydroforming process dehydrogenates the naphthenes to aromatics and may also convert a portion of the paraffins to aromatics. Other reactions probably occur but the abovementioned reactions are the predominant ones.

By hydroforming is meant an operation conducted at elevated temperatures and pressures in the presence of a solid catalyst and added hydrogen for reforming naptha and gasoline fractions to increase the aromaticity thereof without any net consumption of hydrogen during the process. Since there is a net production of hydrogen during the process, the gas separated from the higher boiling products contains hydrogen which is recycled to the process and which provides the hydrogen-containing gas for the hydroforming operation.

According to the present invention the starting material for the catalyst is a crystalline "activated alumina" of commerce. The crystalline activated alumina is pulverized and dried and then treated with an aqueous solution of hydrogen fluoride until the hydrogen fluoride solution is substantially completely absorbed by the activated alumina. The mixture is allowed to stand for an extended period of time to permit reaction between the hydrogen fluoride and the activated alumina base. The mixture is then dried at a moderate temperature for an extended period of time. The dried mixture substantially at room temperature is granulated and then treated with a solution of a platinum compound such as chloroplatinic acid or the like until the solution is substantially completely absorbed by the treated activated alumina. Just sufficient water is added with the platinum-containing solution to form a paste and to permit dispersion of the platinum-containing compound throughout the alumina base in a homogeneous manner.

Hydrogen sulfide is then bubbled through or otherwise contacted with the paste and this pasty mixture is allowed to stand a short time and then dried at a moderate temperature. The resulting mixture is broken up into a powder and, if desired, formed into pills. The catalyst in the desired form is then calcined at an elevated temperature. Preferably following the calcination, the catalyst is reduced with hydrogen and is then ready for use in the hydroforming process. While in the above-described method of preparation of catalysts the activated alumina is HF treated and then the platinum is precipitated thereon, it is within the scope of this invention to first soak the activated alumina with the platinum-containing solution, precipitate the platinum and then HF treat the alumina containing the platinum.

A catalyst prepared according to our method has higher activity and selectivity than catalysts prepared in accordance with the prior art. Our specific method for preparing our catalyst will now be given.

Activated aluminas are well known in the art and may be purchased in the open market. Three crystalline activated aluminas which are of particular value in the preparation of our preferred catalyst are the following grades of Alorco alumina manufactured by the Aluminum Company of America:

| Alorco grade | F-10 | R-2396 | H-41 |
|---|---|---|---|
| Surface area, m.²/g | 90-125 | 135-240 | 200-300 |
| Pore size, Angstroms | 40 | | 30 |
| Porosity, percent | 35 | | 50 |
| Approximate chemical analysis, weight percent: | | | |
| $Al_2O_3$ | 96 | 96 | 90 |
| $SiO_2$ | 0.1 | 0.75 | 5.5 |
| $Na_2O$ | 0.1 | | 0.1 |
| $Fe_2O_3$ | 0.05 | | 0.12 |
| Loss on ignition at 950° F | 3.0 | | 8.5 |

While we have set forth above several specific crystalline activated aluminas which we have used, we are not to be restricted to these specific aluminas because other activated aluminas of commerce can be employed, provided, as previously pointed out, that the aluminas are not of a gel type. While we have specifically set forth the use of crystalline activated aluminas, our catalysts may be prepared from unactivated crystalline aluminas of commerce which are treated for activation purposes, according to known techniques, prior to the preparation steps generally described above and specifically described below.

*Example 1*

About 600 grams of 8–14 mesh F-10 Alorco activated alumina were pulverized so that about 80% of the material passed a No. 60 (U. S.) sieve, and the pulverized alumina was dried at a temperature of about 250° F. overnight or for about 16 hours. The entire batch of dried alumina was then thoroughly mixed at room temperature with an aqueous solution of hydrogen fluoride (prepared by adding 12 grams of 48% aqueous hydrofluoric acid to 400 cc. of distilled water) to form a paste. The entire batch of alumina and all of the HF solution were mixed together at once. The HF solution was substantially completely absorbed by the alumina and the resulting mixture was thoroughly mixed for about ½ hour at room temperature. By paste, wherever mentioned herein, we mean a mixture of such consistency that only about 3–8% liquid of the total volume rises as a supernatant layer after standing for about 15 minutes to one half hour. The paste was permitted to stand at room temperature overnight or for about 16 hours to provide time for reaction between the alumina base and the hydrogen fluoride. This step is of considerable importance. The paste was then dried overnight or for about 16 hours at a temperature of about 250° F. The amount of HF used was about 1% by weight of the alumina.

The dried paste was broken up into a powder and then 75 grams of a 10% aqueous solution of chloroplatinic acid, plus about 400 cc. of distilled water were added to the hydrogen fluoride treated alumina particles at room temperature and the entire batch was mixed for about 15 minutes until the alumina substantially completely absorbed the solution of chloroplatinic acid. In this way the solution of platinum compound impregnates the alumina particles and a very homogeneous distribution of the platinum compound on the alumina particles is obtained. The amount of platinum on the HF treated alumina was 0.5% by weight of the alumina. It is considered undesirable to add excessive water to the catalyst preparation in the two impregnating steps above described.

The paste of HF treated alumina base impregnated with the platinum compound was mixed and during mixing was treated with hydrogen sulfide gas by bubbling the hydrogen sulfide gas through the paste for about 1½ hours at a moderate rate to deposit or precipitate the platinum in situ on the alumina particles. The sulfided pasty mixture was then allowed to stand for about 4 hours at room temperature and was then put in a cold drying oven. The temperature of the oven was then raised and the paste was dried overnight or about 16 hours at about 250° F.

The dried sulfided mixture was then broken up into a powder which was pilled without a binder into cylindrical pills having a size of about $\frac{3}{16}''$ by $\frac{3}{16}''$. The pills were calcined at about 950° F. for about two hours. After calcining, the pills at about room temperature were treated or reduced with hydrogen as the catalyst was slowly brought up to 900° F. overnight or about 16 hours at atmospheric pressure, that is, the temperature was raised 75 to 125° F. per hour. The amount of hydrogen passed over the catalyst was about 100 volumes of hydrogen per volume of catalyst per hour with at least half the treatment or about 8 hours occurring at 800–900° F.

*Example 2*

600 grams of 4–8 mesh H-41 Alorco activated alumina were pulverized and the pulverized alumina was dried at a temperature of about 250° F. overnight or for about 16 hours. The entire batch of dried alumina was then thoroughly mixed at room temperature with an aqueous solution of hydrogen fluoride (prepared by adding 6 grams of 48% aqueous hydrofluoric acid to 500 cc. of distilled water) to form a paste. The paste was mixed, then allowed to stand at room temperature and dried as in Example 1. The dried paste was broken up into a powder and 75 grams of an aqueous 10% solution of chloroplatinic acid plus about 500 cc. of distilled water were added to the HF treated alumina particles at room temperature and mixed for about 15 minutes until the alumina substantially completely absorbed the chloroplatinic acid solution. The catalyst was then finished in the same manner given in Example 1. The catalyst contained 0.5% by weight of platinum and 0.5% by weight of HF.

The above examples give specific details for the production of an improved catalyst according to our invention and while certain of the steps are essential for producing our improved catalyst, such as drying the alumina, contacting the dried alumina with HF and allowing to stand, drying the HF treated alumina, adding the platinum solution to form a paste, treating the paste with H₂S, drying, calcining and reducing; certain of the conditions may be varied and need not be exactly restricted to those given in the examples. For example, drying of the ground activated alumina may be at 212° F. to 950° F. for 2 to 24 hours, the shorter times being used at the higher temperatures. The mixing of the aqueous HF solution and dried, ground activated alumina may be continued for about ten minutes to about one hour, while adding water, if necessary, to maintain a pasty condition of the mixture but excessive water addition is to be avoided. The paste may be allowed to stand at room temperature from about 2 hours to 24 hours to allow time for the reaction between the hydrogen fluoride and alumina base. The paste may then be slowly dried at a temperature of about 212° F. to 400° F. for about 8 hours to 24 hours, the shorter times applying to the higher temperatures. After the addition of the chloroplatinic acid solution to the HF treated and dried alumina to form a paste, the mixing may continue for 5 minutes to one hour at room temperature. It is also possible to add the HF to the chloroplatinic acid solution and then add the resulting mixture to the dried alumina. The HF treated alumina containing the platinum compound is then treated at room temperature with H₂S by bubbling the H₂S gas through the paste while mixing for about ten minutes to three hours.

This hydrogen sulfide treatment may be carried out, if desired, under superatmospheric pressures. This permits the use of shorter treating times. As another alternative the HF treated activated alumina may be put under subatmospheric pressure to degas the alumina by evacuation and then treated with the platinum-containing solution to obtain improved impregnation of the alumina with the platinum. After stopping the addition of H₂S gas, the mixture may be allowed to stand 15 minutes to 24 hours at room temperature. The sulfided mixture may then be dried at about 212° F. to 400° F. for about 2 hours to 24 hours, the shorter times being employed at the higher temperatures. The catalyst, in pilled or powdered form, may be calcined at 800° F. to 1000° F. for about 1 hour to 8 hours, and then reduced with hydrogen by pasing 50 v./v./hr. (volume of hydrogen per volume of catalyst per hour) to 12,000 v./v./hr. of hydrogen at about 700° F. to 1000° F. for about 2 hours to 12 hours. In this hydrogen treatment the treated alumina pills are slowly raised to the final temperature, as above described, preferably starting at room temperature.

For preparing catalysts containing larger amounts of platinum, larger amounts of chloroplatinic acid are used and for catalysts containing more or less fluorine different amounts of HF may be used. Gaseous HF may be used but aqueous solutions of HF are preferred. Instead of using fluorine compounds other halogens such as hydrochloric acid may be used but the fluorine containing substances are preferred.

The amount of platinum in the finished catalyst is preferably between about 0.1% and 1.0% by weight but in some cases may be as high as 2.0%. The amount of HF used may vary from about .25% to 3% by weight of the catalyst with about 0.5% to 1% HF preferred. The H-41 aluminas will generally require smaller HF treats than the F-10 aluminas to produce equivalent results. For example, catalysts prepared from H-41 alumina possess optimum activity when containing about 0.5% HF, whereas those prepared from the pure aluminas (e. g. F-10) possess optimum activity when containing about 1% HF. In general, the use of higher amounts of HF, for the same set of operating conditions, will result in a more active catalyst giving more volatile gasolines (higher Reid vapor pressure) but lower octane number products so that HF treats in the range above given are to be preferred.

For hydroforming operations using our new platinum-containing catalyst the temperature may be between about 600° F. and 1000° F., preferably 800° F. to 950° F., the pressure, atmospheric to about 1000 lbs per square inch, the naphtha feed rate about 0.25 to 4 v./v./hr. (volume of liquid feed per volume of catalyst per hour) preferably 1 to 2 v./v./hr. in a fixed bed unit and the hydrogen-containing recycle gas is recycled at the rate of about 2,000 to 12,000, preferably 6,000 cubic feet per barrel of feed. In the hydroforming process the recycle gas contains about 80 to 99% hydrogen by volume. In general, higher feed rates produce essentially the same yield of gasoline but the octane number and volatility are reduced appreciably.

The platinum-containing catalysts prepared by the above-described specific method when used in hydroforming give improved results at high pressures from about 500-1000 lbs. per square inch but they are even more effective at low pressures of the order of 50 to about 250 lbs. per square inch.

Catalysts of the same nominal composition as described above can be made by other methods. However, as will be seen by the following example, the catalysts prepared according to the method of the present invention possess superior activity and selectivity in the hydroforming of naphthas.

*Example 3*

The naphtha feed was a virgin naphtha having a boiling range of about 200–360° F. and a research octane number of about 45 (unleaded). This virgin naphtha contained about 41 volume per cent of naphthenes, 51 volume per cent of paraffins and 8 volume per cent of aromatics. This virgin naphtha was hydroformed over catalysts prepared as described in Examples 1 and 2 above as well as in the presence of two other catalysts to be described hereinafter in connection with the last two columns in the table.

These catalysts were used in pill form as a fixed bed which was heated to a temperature of about 900° F. The heating was done by an electric coil wound around the reactor. The feed rate was about 1.2 v./v./hr. and the amount of hydrogen gas used was about 6,000 cubic feet per barrel of naphtha feed. The following table summarizes the data obtained when using these catalysts.

TABLE

| Catalyst composition: | | | | | | |
|---|---|---|---|---|---|---|
| Percent platinum (weight) | 0.5 | 0.5 | 0.5 | 0.5 | 0.5 | 0.5 |
| Percent HF treated alumina | 99.5% F-10 Al₂O₃ | 99.5% H-41 Al₂O₃ | | | 99.5% alumina gel | |
| Percent HF on alumina (added) | a 1.0 | d 2.0 | b 0.5 | e 2.0 | f 2 | g 2 |
| Percent fluorine on alumina (by analysis) | 0.89 | 1.47 | 0.48 | 1.87 | 0.90 | |
| Reaction conditions: | | | | | | |
| Temperature, °F | 893 | 905 | 899 | 908 | 918 | 900 |
| Pressure, p.s.i.g. | 750 | 750 | 750 | 750 | 750 | 650 |
| Feed rate, v./v./hr | 1.3 | 1.2 | 1.3 | 1.2 | 1.2 | 1.0 |
| H₂ Hydrocarbon mol ratio c | 6.1 | 5.5 | 5.9 | 5.8 | 6.0 | 6.7 |
| Gasoline 100% C₄+ basis: | | | | | | |
| Yield, volume percent | 95.6 | 94.7 | 95.4 | 94.1 | 98.8 | 83.0 |
| Research octane number (clear) | 87.7 | 95.2 | 90.2 | 96.4 | 80.0 | 76.8 |
| Reid vapor pressure | 13.2 | 30.3 | 15.7 | 26.8 | 15.3 | 16.7 |
| Gasoline C₅+ basis: | | | | | | |
| Research octane number (clear) | 84.5 | 90.0 | 87.0 | 91.8 | 74.4 | 71.8 |
| Reid vapor pressure | 2.9 | 9.9 | 4.5 | 6.1 | 4.8 | 8.4 | a As described in Example 1.
b As described in Example 2.
c Each H₂/HC mol ratio is about equivalent to 1000 cu. ft. of hydrogen per barrel of naphtha feed.
d As per Example 1 but with 2% HF.
e As per Example 2 but with 2% HF.
f The catalyst was prepared as follows:
Diluted ammonium hydroxide was added to an aluminum chloride solution with stirring, the final pH being adjusted to about 9.5. After filtering the aluminum hydroxide precipitate and back-washing in a filter press, the precipitate was re-slurried, filtered and back-washed for five additional times. Thirty-two kilograms of wet cake were prepared in this manner, having an ignition loss of 90.4% at 1000° F. This gel was treated with a solution of 1000 cc. of water plus 128 grams of 48% aqueous HF, and was thoroughly mulled in a Lancaster mixer for one hour, so that an HF treat of 2% based on the alumina content was made. A portion of this HF treated alumina gel corresponding to 390 grams of alumina was dried overnight at 250° F., calcined for 2 hours at 925° F. and then pulverized in a Braun pulverizer. A solution of 50.8 grams of 10% chloroplatinic acid plus 280 cc. of water was mixed very thoroughly with the treated alumina gel particles. This material was treated with hydrogen sulfide and then dried overnight. After drying overnight at 250° F. the catalyst was pilled.
g This catalyst was prepared in the following manner:
A solution of aluminum chloride was stirred into dilute ammonium hydroxide, the final pH being adjusted to about 10. The precipitate was washed and reslurried three times with dilute ammonium hydroxide (pH=10). The washed cake was treated with 2% HF by weight, based on the alumina content, and mixed with a slurry made by bubbling hydrogen sulfide through a dilute chloroplatinic acid solution. After drying at 250° F. and calcining for 3 hours at 950° F. the catalyst was pilled.

From the data given in the above table, it will be seen that, under comparable operating conditions catalysts prepared according to the method of this invention permit the production of gasolines of higher octane number than can be obtained with catalysts of the same nominal composition prepared by other means.

While the specific examples above given show results obtained in a hydroforming operation using the catalyst as a fixed bed, it is to be understood that our improved catalyst may be used in pill or bead form in a moving bed operation where the catalyst moves down as a compact mass through a reactor or the catalyst may be ground and used in powdered form where the catalyst is maintained as a dense fluidized turbulent bed in a reactor by the upflowing reaction gases. When using a fluid process the crystalline alumina is ground to the proper size so that after the catalyst is made by the above method it will be of the proper size for the fluid process.

There is a net production of hydrogen during the hydroforming process carried out with our catalysts and the gas separated from higher boiling products is very rich in hydrogen, and in a continuous process a major proportion of this hydrogen-containing gas is recycled to the hydroforming reactor so that extraneous hydrogen is not needed.

At the high pressures 500–750 lbs./sq. in. there is substantially no deposition of coke on the catalyst and the operation may be carried on for long times without any regeneration of the catalyst. However, at lower pressures, coke or carbonaceous material may be laid down on the catalyst and it may be necessary to regenerate the catalyst at intervals. When using the HF treated catalyst, the regeneration of the catalyst is preferably done with hydrogen by passing the hydrogen (8000–12000 v./v./hr.) over the catalyst to remove the carbonaceous material. When using HF treated catalysts, air may be used to regenerate the catalyst but in such cases it may be necessary to treat the catalyst with HF following the regeneration treatment or during regeneration treatment.

What is claimed is:

1. Process of manufacturing platinum-containing reforming catalysts which comprises mixing a crystalline "activated alumina" with an aqueous HF solution to form a paste using sufficient solution to be the equivalent of 0.25% to 3.0% of HF on alumina by weight, mixing the paste and then permitting the mixture to stand at room temperature to permit reaction between the alumina and the HF, drying the paste and then mixing it with a solution of a platinum compound to form a paste, said amount of solution being sufficient to provide about 0.1 to 2.0% by weight of platinum on the alumina, then treating the paste with H₂S for an extended period of time to uniformly deposit the platinum on the alumina base, permitting the sulfided mixture to stand at room temperature for an extended period of time sufficient to allow the desired reaction, then drying the sulfided mixture and after drying, calcining the mixture at an elevated temperature and then treating the calcined mixture with hydrogen to reduce the platinum to the metallic state.

2. Process of manufacturing platinum-containing reforming catalysts which comprises mixing a dry crystalline "activated alumina" with an aqueous solution containing activating amounts of fluorine and using only a sufficient amount of the solution so that it is substantially completely absorbed by the alumina to form a paste using sufficient solution to be the equivalent of 0.25% to 3.0% of HF on alumina by weight, permitting the pasty mixture to stand to allow time for reaction between the fluorine containing solution and the alumina, drying the fluorine treated alumina and then mixing it with a sufficient amount of aqueous solution of a platinum compound such that the solution is substantially completely absorbed by the alumina said amount of solution being sufficient to provide about 0.1 to 2.0% by weight of platinum on the alumina, treating the mixture with H₂S to precipitate platinum on the alumina in a homogeneous manner, calcining the resulting mixture and then treating the calcined mixture at a slowly rising temperature with hydrogen to reduce the platinum to the metallic state.

3. Process for making platinum-containing reforming catalysts which comprises drying solid particles of a crystalline "activated alumina," mixing the dried alumina particles with an aqueous solution carrying an activating amount of a fluorine containing substance to form a paste using sufficient solution to be the equivalent of 0.25% to 3.0% of HF on alumina by weight with the alumina substantially completely absorbing the solution, permitting the paste to stand to allow reaction between the alumina particles and the fluorine containing substance, heating the resulting paste to dryness, mixing a water solution of a platinum compound with the dried treated alumina particles at room temperature to form a paste said amount of solution being sufficient to provide about 0.1 to 2.0% by weight of platinum on the alumina, treating the paste with hydrogen sulfide to react with the platinum compound and permitting the sulfided mixture to stand at room temperature for a sufficient period of time to permit the platinum to be laid down in a homogeneous manner on the alumina particles, drying the sulfided mixture, then calcining the dried sulfided mixture and thereafter treating the calcined mixture with hydrogen to reduce the platinum to the metallic state.

4. A process of making platinum-containing reforming catalysts which comprises mixing dry crystalline "activated alumina" particles with an aqueous solution of HF to form a paste and having sufficient HF present in an amount equivalent to about 1% HF on the alumina by weight, permitting the mixture to stand at room temperature to allow reaction between the alumina particles and the HF, heating the paste to dryness, mixing a solution of a platinum compound with the dried HF-treated alumina particles at room temperature to form a paste and using sufficient amount of the platinum compound to have about 0.5% of platinum by weight of the alumina in the final catalyst, treating the resulting paste with hydrogen sulfide, permitting the sulfided mixture to stand for a sufficient period of time to permit the desired reaction and to homogeneously deposit platinum on the particles of treated alumina particles, drying the sulfided mixture, then calcining the dried sulfided mixture and thereafter treating the said mixture with hydrogen to reduce the platinum to the metallic state.

5. A process for making platinum-containing reforming catalysts which comprises drying solid particles of a crystalline "activated alumina," mixing the dried activated alumina particles with an aqueous solution of HF to form a paste and using sufficient HF to be the equivalent of 0.25% to 3% of HF on alumina by weight, mixing the resulting paste for about half an hour at room temperature and then permitting the mixture to stand at room temperature for an extended period to provide time for reaction between the alumina particles and the HF, drying the HF treated alumina particles for an extended period at a temperature of about 250° F., mixing the resulting dried alumina particles with a platinum-containing solution sufficient to provide about 0.1 to 2% by weight of platinum on the alumina, passing hydrogen sulfide through the mixture of alumina particles containing the platinum compound to deposit the platinum on the alumina particles, drying the sulfided mixture for an extended period at about 250° F., calcining the dried sulfided particles at a temperature between about 800° F. and 1000° F. for about 2 hours and then reducing the catalyst with hydrogen by passing hydrogen over the catalyst for an extended period with a slowly rising temperature with the final temperature being between about 900° F. and 1000° F. to reduce the platinum to the metallic state.

6. A process for making platinum-containing reforming catalysts which comprises drying solid particles of crystalline "activated alumina," mixing the dried alumina particles with an aqueous solution of HF to form a paste and using sufficient HF to be the equivalent of about 0.5 to 1% HF on alumina by weight, mixing the resulting paste for about half an hour at room temperature and then permitting the mixture to stand at room temperature for an extended period to provide time for reaction between the alumina particles and the HF, drying the HF-treated alumina particles for an extended period at a temperature of about 250° F., mixing the resulting dried alumina particles with a platinum-containing solution sufficient to form a paste and to provide about 0.5% by weight of platinum on the alumina, passing hydrogen sulfide gas through the paste of alumina particles containing the platinum compound to homogeneously deposit the platinum on the alumina particles, drying the sulfided mixture for an extended period at about 250° F., calcining the dried sulfided particles at a temperature between about 900° F. and 950° F. for about 2 hours and then reducing the catalyst with hydrogen by passing hydrogen over the catalyst for an extended period with a slowly rising temperature and the final temperature being between about 900° and 950° F. whereby substantially all of the platinum is reduced to the metallic states.

WALTER R. F. GUYER.
JOHN P. THORN.
ERVING ARUNDALE.

References Cited in the file of this patent

UNITED STATES PATENTS

| Number | Name | Date |
| --- | --- | --- |
| 2,348,624 | Hillman | May 9, 1944 |
| 2,381,562 | Stewart | Aug. 7, 1945 |
| 2,426,118 | Parker et al. | Aug. 19, 1947 |
| 2,478,916 | Haensel et al. | Aug. 16, 1949 |
| 2,479,109 | Haensel | Aug. 16, 1949 |
| 2,606,878 | Haensel | Aug. 12, 1952 |